United States Patent [19]

Sumida

[11] 4,221,147
[45] Sep. 9, 1980

[54] NIBBLER ACCESSORY FOR MACHINE TOOL

[76] Inventor: Kunio A. Sumida, 1114 N. Kenter Ave., Los Angeles, Calif. 90049

[21] Appl. No.: 17,442

[22] Filed: Mar. 5, 1979

[51] Int. Cl.² ............................................. B23D 27/00
[52] U.S. Cl. ....................................... 83/574; 83/628; 83/902; 83/916
[58] Field of Search ................. 83/574, 628, 902, 916; 144/34 A; 29/26 A

[56] References Cited

U.S. PATENT DOCUMENTS

| | | | |
|---|---|---|---|
| 2,214,584 | 9/1940 | Haydenburg | 83/574 |
| 2,387,411 | 10/1945 | Schmidt | 83/574 |

*Primary Examiner*—J. M. Meister
*Attorney, Agent, or Firm*—Charles H. Schwartz

[57] ABSTRACT

A sheet metal cutting attachment for a machine tool of the type including a rotatable chuck driven from a source of power and with the rotatable chuck supported in a bearing structure for rotation around a vertical axis and with the machine tool including a bed portion having a horizontal plane surface spaced from the rotatable chuck, including an elongated body member including a first end formed as a bearing support and a second end formed as a support for a cutting tool and with the body member including means for mounting the body member on the bed portion of the machine tool and with the first end adjacent the rotatable chuck and the second end overhanging the edge of the bed portion, an eccentric drive member including a shaft portion including oppositely disposed ends for rotatable support by the rotatable chuck of the machine tool and the bearing support of the body member end and including an integral eccentric center portion, the cutting tool formed as a concentric sliding punch and die set and with the punch and die supported by the second end of the body member, and a connecting rod coupled at one end to the eccentric center portion of the eccentric drive member and coupled at the other end to the punch and with the connecting rod converting the eccentric rotary motion of the eccentric center portion to a sliding motion for the punch.

14 Claims, 6 Drawing Figures

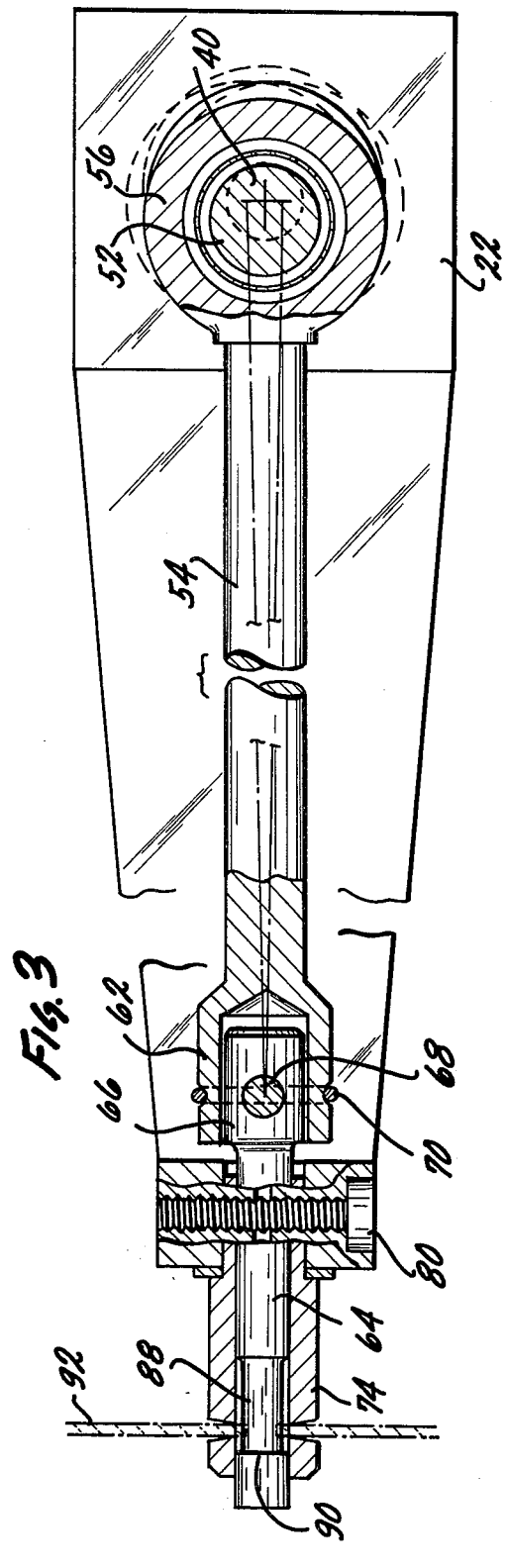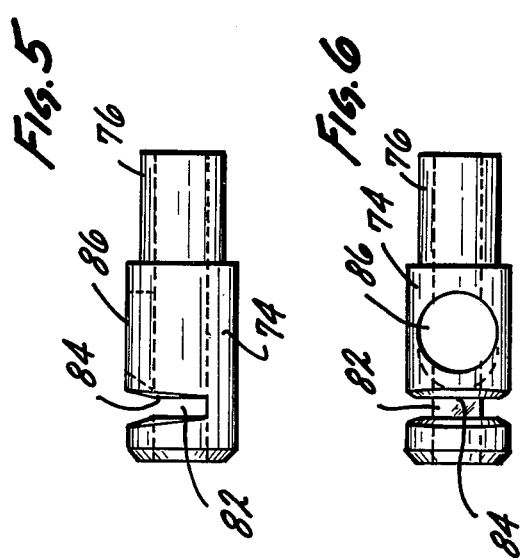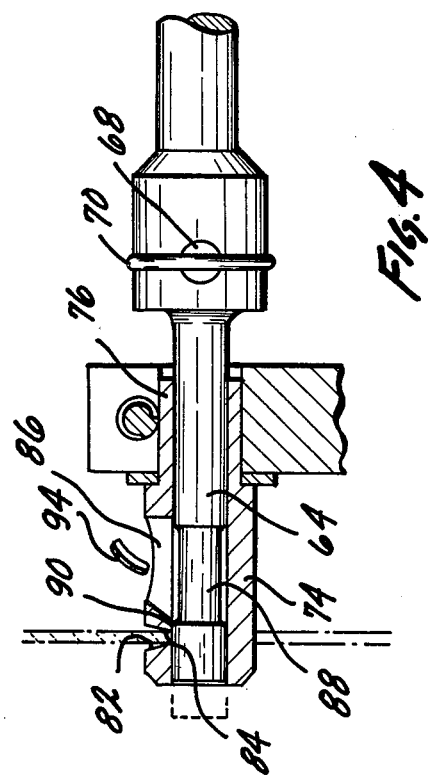

NIBBLER ACCESSORY FOR MACHINE TOOL

The present invention is directed to a nibbler accessory for use with a machine tool such as a drill press or a mill. Specifically, the nibbler accessory of the present invention may be used with any type of machine tool which includes a rotatable chuck member which would normally support a cutting tool, and with the chuck member spaced from a bed which would normally support a work piece.

In the prior art it is known to provide for a cutting apparatus generally known as a nibbler which is adapted to cut sheet material to a desired shape. In the nibblers of the prior art a punch is reciprocated relative to a die between a cutting stroke and a return stroke. Sheet metal is fed between the punch and die set and the sheet metal is nibbled away by action of the punch and die cutting small progressive portions of the sheet metal.

Generally in the prior art, the nibblers may be large fixed pieces of equipment which typically include their own source of power and normally include a horizontal surface on which the sheet metal is supported while the sheet metal is fed between the punch and die. In these large fixed type of nibblers, the reciprocating punch member may either extend from below the horizontal surface or from above the horizontal surface. In either case these large fixed machines are relatively cumbersome and expensive and provide littler flexibility in cutting different types and shapes of materials. In addition, it may be difficult to follow the exact shape in cutting the sheet metal, since the operator must bend over the sheet metal to observe the cutting line.

Another type of nibbler is a hand-held portable device which normally must be supported above the sheet metal to be cut and which must be guided relative to the sheet metal. This is in contrast to the large fixed devices where the sheet metal is guided relative to the nibbler punch. The portable devices are limited by size as to the thickness of sheet material which can be cut. Also, the portable device may be difficult to guide since the operator must support the entire weight of the portable device during the cutting operation.

The present invention is directed to a nibbler accessory for use with an existing machine tool so as to provide for a number of the advantages of the prior art devices at a relatively low cost. In particular the nibbler accessory of the present invention is used with a machine tool such as a drill press or mill and therefore can use the existing power sources of these machine tools. The nibbler accessory of the present invention thereby provides for the nibbler operation without the necessity of having a large fixed tool and without some of the inconveniences of the portable tool.

In the nibbler accessory of the present invention a rotatable shaft portion of an eccentric drive is coupled within the rotatable chuck of the machine tool. A body portion of the nibbler accessory is clamped to the bed of the machine tool located below the rotatable chuck. As the machine tool is operated the shaft portion of the eccentric drive is rotated to provide for a reciprocation of a punch member relative to a die in the plane perpendicular to the chuck and parallel to the bed of the machine tool.

The reciprocating punch is positioned beyond the edge of the bed member by the body portion and the work piece may be fed between the punch and the die in a vertical direction. This allows the operator to visually observe the cutting action without any parallax. The vertical feeding also allows for an easy maneuvering of the work piece since the nibbler accessory may be used to support the weight of the work piece and the operator merely has to provide a guiding action by pivoting the work piece about the nibbler accessory so as to change the cutting direction.

The rotatable shaft portion of the eccentric drive may have its lower end within a bearing structure located below the eccentric drive. In addition, the bearing structure for the chuck of the machine tool is located above the eccentric drive so that the shaft portion of the eccentric drive is maintained in a self-aligned bearing structure. This self-aligning allows for the loads to be distributed smoothly through the accessory and the machine tool so as to provide for a smooth cutting action. The self-aligning also minimizes any vibrations which may occur during use of the accessory. In addition, the body of the nibbler accessory is normally clamped to the bed of the machine tool so as to provide for a solid structure to absorb the loads.

A clearer understanding of the invention will be had with reference to the following descriptions and drawings wherein, FIG. 1 illustrates a perspective view of a nibbler attachment of the present invention mounted on a machine tool.

FIG. 3 illustrates a top view taken along lines 3—3 of FIG. 2.

FIG. 4 illustrates a side detailed view showing the operation of the punch and die of the nibbler attachment.

FIG. 5 illustrates a side view of the die, and

FIG. 6 illustrates a top view of the die.

Figure 1:
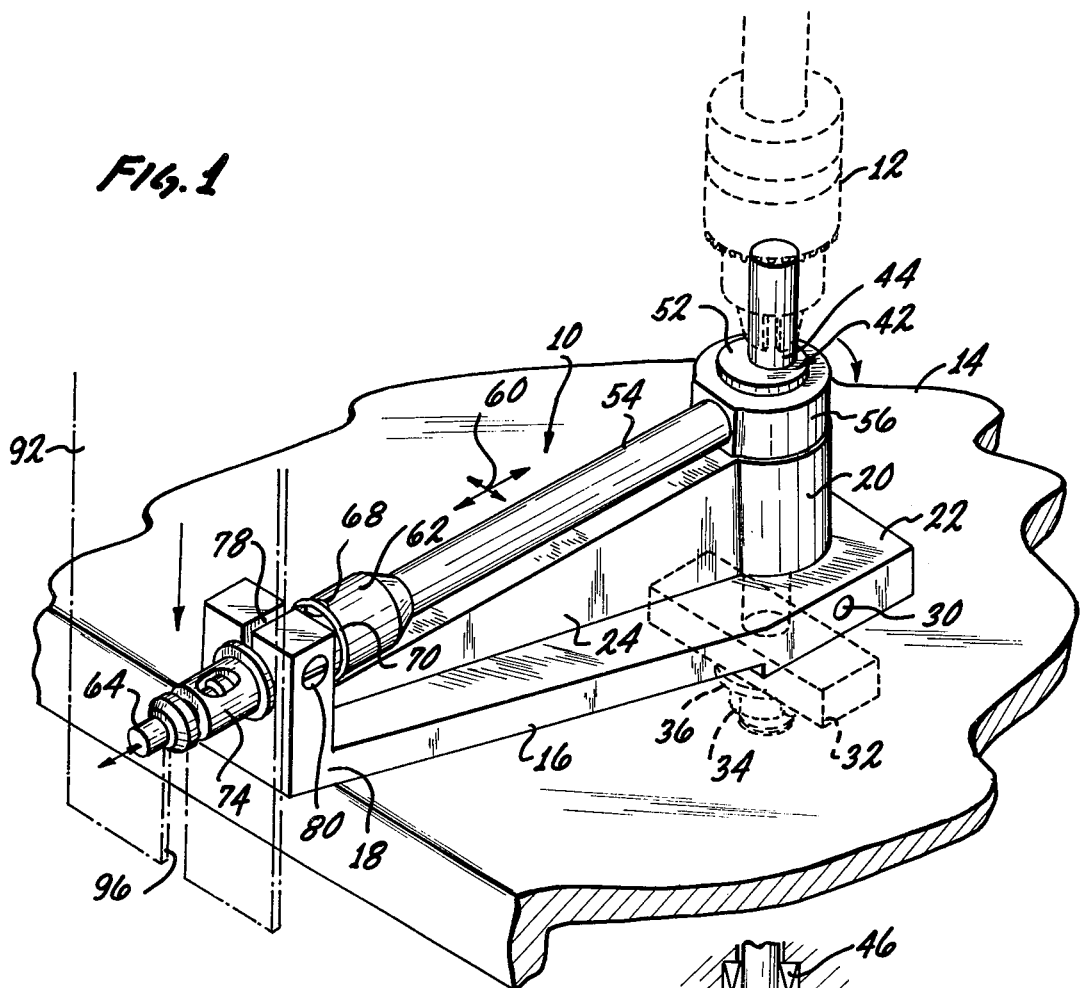
Figure 2:
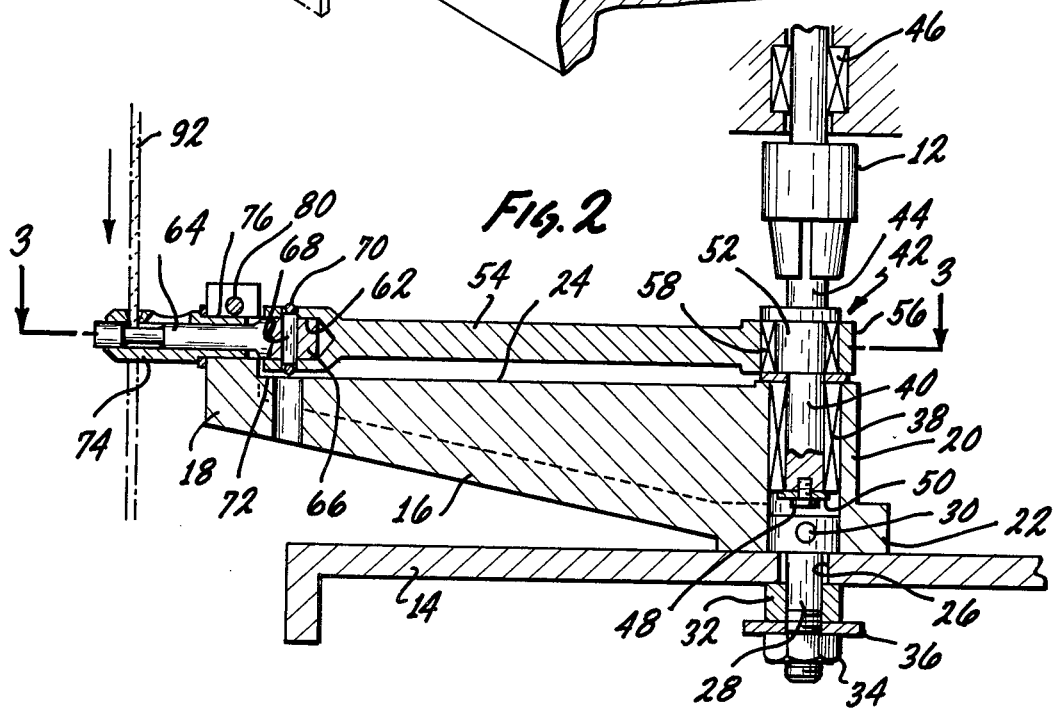
FIG. 2 illustrates a side cross-sectional view of the nibbler attachment mounted on a machine tool.

In FIGS. 1 and 2, a nibbler accessory 10 is shown supported between a chuck 12 and a bed 14 of a machine tool such as a drill press or a mill. Normally, the chuck 12 would hold a cutting tool such as a drill and with the work piece supported on the bed 14. The chuck 12 is rotatably driven by a source of power such as a motor not shown, to provide for a cutting action on the work piece as supported by the bed. The machine, therefore, includes the rotatable chuck member 12, spaced from the bed member 14 and with the nibbler accessory 10 of the present invention supported for operations between these members.

Specifically, the nibbler accessory 10 includes an elongated body member 16, including an upstanding flange portion 18 at one end which extends past the edge of the bed 14. The body member also has a bearing support section 20 at the other end. The bearing support section 20 extends integrally from a mounting support section 22 of the body member 16. Also a web portion 24 of the body member 16 extends between the flange portion 18 and the bearing support section 20 so that the total body member 16 provides for a solid rigid structure.

The mounting support section 22 is mounted to the bed 14 through an opening 26 and with the use of a bolt member 28. Specifically the head of the bolt member 28 fits within an opening in the mounting action 22 of the body member 16 and is retained in position by a pin member 30. In particular, the pin member 30 passes through an opening in the mounting portion 22 and a complimentary opening in the head portion of the bolt 28. A bar member 32, which has an opening to pass the mounting bolt 28, is positioned on the side of the bed 14 opposite the mounting 22. Finally, a nut member 34 and a washer member 36 are tightened on the end of the bolt 28 so as to mount the nibbler accessory 10 to the bed 14 of the machine tool.

The bearing support section 20 receives a bearing structure 38 which bearing structure 38 is used to provide for a free rotation of a lower shaft portion 40 within the bearing structure. Specifically, the lower shaft portion 40 is part of an eccentric drive member 42 which also includes an oppositely disposed upper shaft portion within 44. The shaft member 40 is held within the bearing structure 38 through the use of a screw member 48, acting on a washer 50. The upper shaft portion 44 is supported for rotation by the chuck member 12. The chuck member 12 also includes at an upper end a bearing support section 46 so that the eccentric drive member 42 is supported for rotation between bearing structures located to both sides of the eccentric drive. The bearing support on both sides provides for an equalization of the forces on the nibbler accessory, and also provides for self-alignment of the eccentric drive. The equalization of the forces and the self-aligning help to produce a smooth operation for the nibbler accessory of the present invention.

The eccentric drive member 42 includes a center portion 52 which is offset from the upper and lower shaft portions 44 and 40. The shaft portions are rotated in accordance with the rotation of the chuck member 12 and the offset center portion 52 thereby rotates with an eccentric motion.

The eccentric rotary motion provided by the eccentric drive member 42 is coupled to the cutting end of the nibbler attachment through a connecting rod 54. The connecting rod 54 includes an end portion 56 which receives the center section 52 of the eccentric drive member 42. The end portion 56 includes a bearing structure 58 and the center section 52 rotates within the bearing structure. As the chuck 12 rotates, this in turn provides for an eccentric rotation of the center portion 52 within the end portion 56 of the connecting rod. The connecting rod thereby moves back and forth and with a slight angular movement shown by the arrows 60 in FIG. 1.

The other end of the connecting rod 54 is an enlarged cup-shaped member 62, which is used to provide for connection to a nibbler punch 64. Specifically, an end portion 66 of the nibbler punch fits within the cup-shaped member 62. A pin member 68 passes through openings in the cup-shaped member 62 and the end portion 56 to provide for a pivotable connection between the connection rod 54 and the nibbler punch 64. A split retaining ring 70 fits within a groove in the cup-shaped member 62 so as to retain the pin 68 in position. An opening 72 may be provided within the body member 16 to allow for the removal of the pin 68 when the split ring 70 is removed from the groove. It is to be appreciated that after a period of use it may be desirable to change the nibbler punch.

The nibbler punch 64 fits within a central opening in a nibbler die 74 to provide for a sliding action between the die and the punch. The upstanding flange portion 18, of the body member 16, includes a split opening 78 to receive a portion 76 of the die 74. Specifically, the portion 76 of the die 74 is positioned within the split opening 78 of the flange 18 and with the split allowing for the split opening 78 to be closed so as to lock the portion 76 of the die 74 in position. This is accomplished through the use of a screw member 80 which extends across the split of the split opening 78 and which provides for a clamping action on the portion 76 of the die 74.

FIGS. 3 and 4 illustrate in more detail the cutting action between the punch and the die and FIGS. 5 and 6 illustrate in more detail the construction of the die member 74. As shown in FIGS. 5 and 6, the die member 74 includes an opening 82 to receive the work piece and with an edge portion 84 to serve as a cutting edge. An opening 86 is used to allow the chips that are removed from the work piece to be extracted from the tool during the cutting operation.

Referring now to FIGS. 3 and 4, it can be seen that the nibbler punch 64 is positioned for sliding action within the die 74. The nibbler punch 64 includes a recessed portion 88 and with an edge portion 90 serving as a cutting edge. As shown in FIGS. 2 and 3, the nibbler punch 64 is in the return position so that a work piece 92 will have the surface to be cut lying against the recessed portion of the nibbler punch 64.

As the punch 64 is moved towards the work piece during a cutting stroke, the combination of the cutting edge 90 of the punch and the cutting edge 84 of the die produces a shearing of a portion of the material of the work piece 40 as to cut off a chip of material such as chip 94 shown in FIG. 4. As the chip is cut from the work piece, it is extracted from the tool through the opening 86 in the die. As the punch is moved back and forth between cutting and return strokes, progressive chips are cut and removed to provide for a cut in the work piece such as shown by slot 96 of work piece 92 shown in FIG. 1. The weight of the work piece in the vertical direction provides for the progressive contact of the cutting surface of the work piece with the tool and wherein the operator need only guide the work piece to provide for a cut along a desired line. The direction of cutting may easily be changed by pivoting the work piece in its own plane around the cutting tool.

It can be seen therefore that the present invention is directed to a nibbler attachment which is a separate mechanism attached to an existing machine tool. The attachment may be clamped between the rotating chuck of the machine tool and the bed of the machine tool so as to accurately align the nibbler accessory with the bearing structure present in the existing machine tool and the bearing structure present in the nibbler accessory. The various forces are, therefore, supported by these bearing forces and provide for a self-aligning of the tool.

Since the nibbler attachment of the present invention is positioned to extend over the edge of the bed of the tool, it is relatively easy to feed the work piece since the work piece may be fed in a vertical direction and with the tool supporting the work piece and with the operator guiding the work piece by pivoting the work piece to cut a desired shape. The operator, of course, may accurately align the tool with the work piece since the operator would generally be looking directly at the tool and would not have to bend over the work piece as with existing devices. This helps to eliminate parallax and thereby provide for an accurate cut. It is to be appreciated that although the device is shown to operate with the work piece moved in a downward direction, it would be possible by rotating the die to provide for a cutting action in other directions.

Although the invention has been shown with reference to a particular embodiment, it is to be appreciated that various adaptations and modifications may be made and the invention is only to be limited by the appended claims.

I claim:

1. A nibbler attachment for use with a machine tool of the type having a rotatable chuck member and a bed portion spaced from the rotatable chuck, including
    an elongated body member for mounting on the bed portion of the machine tool and for extending at one end from a position adjacent the rotatable chuck to an other end past the edge of the bed portion,
    a rotatable eccentric drive member, including first and second oppositely disposed shaft portions and an intermediate eccentric center portion and with the first shaft portion for coupling to the rotatable chuck for producing an eccentric rotary motion of the center portion in accordance with a rotation by the rotatable chuck,
    the body member at the end including means for supporting the second shaft portion of the eccentric drive member for rotation,
    a nibbler punch and die for producing a cutting action in accordance with relative sliding motion between the punch and die,
    the body member at the other end including means for supporting the nibbler punch and die for producing the cutting action at the position past the edge of the bed portion and
    a connecting rod interconnecting the center portion of the eccentric drive and the nibble punch and die for converting the eccentric rotary motion of the center portion to a relative sliding motion between the nibbler punch and die.

2. The nibbler attachment of claim 1 wherein the body member includes means for clamping the body member to the bed portion.

3. The nibbler attachment of claim 1 wherein the first and second shaft portions and the center portion of the eccentric are all formed with circular cross sections and the center axis of the center portion offset from a common center axis of the first and second shaft portions.

4. The nibbler attachment of claim 1 wherein the means included in the body member for supporting the second shaft portion additionally includes a bearing structure.

5. The nibbler attachment of claim 1 wherein the nibbler punch and die are formed concentrically with the nibbler punch sliding within an opening in the nibbler die.

6. The nibbler attachment of claim 1 wherein the means including in the body member for supporting the nibbler punch and die additionally includes means for clamping the die in a stationary position while allowing sliding motion of the punch.

7. The nibbler attachment of claim 1 wherein the connecting rod includes a first end having an opening for receiving the center portion of the eccentric drive and includes a second end coupled to the nibbler punch with a pin member.

8. A sheet metal cutting attachment for a machine tool of the type including a rotatable chuck driven from a source of power and with the rotatable chuck supported in a bearing structure for rotation around a vertical axis and with the machine tool including a bed portion having a horizontal plane surface spaced from the rotatable chuck, including
    an elongated body member including a first end formed as a bearing support and a second end formed as a support for a cutting tool and with the body member including means for mounting the body member on the bed portion of the machine tool and with the first end adjacent the rotatable chuck and the second end overhanging the edge of the bed portion,
    an eccentric drive member including a shaft portion including oppositely disposed ends for rotatable support by the rotatable chuck of the machine tool and the bearing support of the body member and including an integral eccentric center portion
    a cutting tool formed as a concentric sliding punch and die set and with the punch and die supported by the second end of the body member, and
    a connecting rod coupled at one end to the eccentric center portion of the eccentric drive member and coupled at the other end to the punch and with the connecting rod converting the eccentric rotary motion of the eccentric center portion to a sliding motion for the punch.

9. The attachment of claim 8 wherein the bed portion includes an opening passing through the bed portion and wherein the means for mounting the body member includes a bolt for passing through the opening and a nut for tightening on the bolt to clamp the body member to the bed portion.

10. The attachment of claim 8 wherein the integral eccentric center portion of the eccentric drive member has a circular cross-section having a central axis offset from the axis of rotation of the shaft portion for producing eccentric rotation of the center portion relative to the axis of rotation of the shaft portion.

11. The attachment of claim 8 wherein the bearing structure formed at the first end of the body member is aligned with the bearing structure of the machine tool to equalize the forces on the attachment.

12. The attachment of claim 8 wherein the punch and die set are supported for sliding movement along an axis parallel to the horizontal plane surface of the bed portion and for producing a cutting of sheet metal located in a place perpendicular to the horizontal plane surface of the bed portion.

13. The attachment of claim 13 wherein the second end of the body member includes means for clamping the die in a fixed position and with the punch sliding relative to the die.

14. The attachment of claim 13 wherein the connecting rod includes at the one end an opening for rotatably receiving the eccentric center portion and includes at the other end a pin coupling to the punch.

* * * * *